March 9, 1926. 1,575,613
K. BECHHEIM
REAMER
Filed Nov. 19, 1923
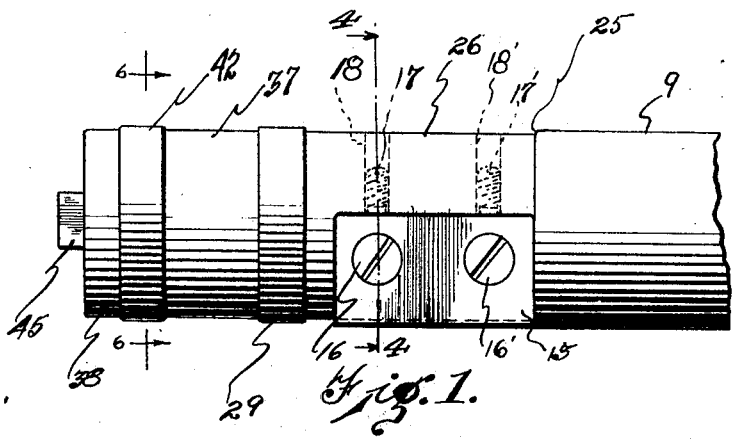
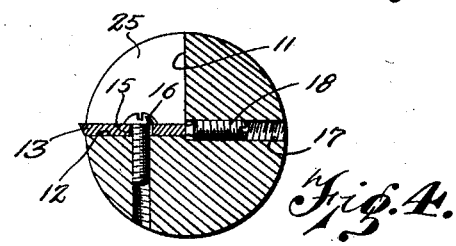
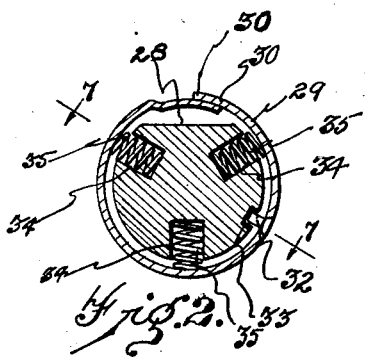
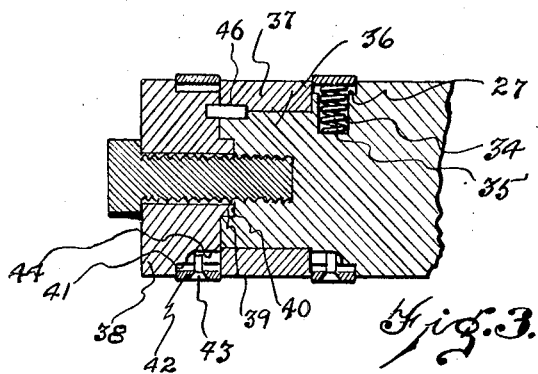
INVENTOR.
Karl Bechheim
BY
ATTORNEY.

Patented Mar. 9, 1926.

1,575,613

UNITED STATES PATENT OFFICE.

KARL BECHHEIM, OF DETROIT, MICHIGAN.

REAMER.

Application filed November 19, 1923. Serial No. 675,656.

*To all whom it may concern:*

Be it known that I, KARL BECHHEIM, a citizen of the Republic of Germany, residing at 1793 Sheridan Avenue, Detroit, in the county of Wayne and State of Michigan, have invented a new and useful Improvement in a Reamer, of which the following is a specification.

My invention relates to a new and useful improvement in a reamer and has for its object the provision of a reamer having a head adapted to serve for a pilot for the cutting element mounted thereon.

Another object of the invention is the provision of a reamer having a single cutting element mounted thereon.

Another object of the invention is the provision of a reamer having a cutting element mounted on the head and adapted to engage the interior surface of a bore to be reamed, the head engaging the bore at a point diametrically opposite the point of engagement of the cutting element with the bore.

Another object of the invention is the provision in a reamer of a cutting element mounted on the head and adapted for adjustment relatively to the longitudinal axis of the head.

Another object of the invention is the provision of a reamer having a substantially cylindrical head and a cutting element mounted thereon, the periphery of the head being adapted to engage the interior of the bore to be reamed, to serve as a pilot for the cutting element.

Another object of the invention is a provision in a reamer of yieldable means adapted for engagement with the interior of a bore to be reamed, to serve as a pilot for the cutting element.

Another object of the invention is the provision in a reamer of a head mounted thereon, having a cutting element, one side of said head being adapted to engage the periphery of the bore to be reamed to serve as a pilot for the cutting element and additional bearing members mounted on said reamer for engaging the interior surface of the bore to be reamed in front of the cutting element.

Another object of the invention is the provision in a reamer having a head carrying a cutting element of a plurality of members adapted to bear against the interior surface of the bore to be reamed for serving as a pilot for the cutting element.

Other objects will appear hereinafter.

The invention consists in the combinations and arrangements of parts hereinafter described and claimed.

The invention will be best understood from a reference to the accompanying drawings which form a part of this specification and in which, Fig. 1 is a fragmentary side elevational view of the invention, Fig. 2 is a sectional view taken on substantially line 6—6 of Fig. 1.

Fig. 3 is a sectional view taken on substantially line 7—7 of Fig. 2.

Fig. 4 is a sectional view taken on substantially line 4—4 of Fig. 1.

As shown in the drawings, the reamer is provided with a shank 9 having a head 26, which is of smaller diameter than the shank 9. A portion of the head 26 is cut away, as shown in Fig. 4, to provide edges 11 and 12. Mounted upon the edge 12 is a cutting element 13 having the usual tapered cutting edge. The cutting element 13 is provided with spaced elongated slots 14 and 15 for the reception of bolts 16 and 16' which are threaded into the main body of the head. Formed in the head are openings 17 in which are threaded adjusting screws 18 and 18', set screws being adapted to thread into engagement with the rear edge of the cutting element 13 for properly adjusting the same, depending upon the cut desired to be made. After adjustment of the cutting element, the same is tightened into position by means of the screws 16 and 16', as will be readily understood.

In the use of the reamer for reaming bores, the plate 13 may be set at an angle relatively to the longitudinal axis of the shank, if so desired, and it is believed that in practical operations, this adjustment of the plate may often be most efficient.

As shown in the drawings the shank 9 is provided with a shoulder 25 formed by the head 26 which is of smaller diameter than the shank 9. Mounted on the head 26 in the manner already described is a cutting element 13 provided with the adjusting screws 17. The head 26 is provided with a peripheral groove 27, this portion of the head being cut away, as at 28, to provide a space for the overlapping ends 30 and 31 of a metallic resilient ring 29, which is positioned in the groove 27. Formed in the member 26 is a pocket 33, adapted for receiving the stud, or pin, 32 which is fixedly mounted in the ring 29. Formed in the member 26 are pockets 34, in which are positioned coil springs 35 adapted to press the ring 29 outwardly from the peripheral groove. As shown in Fig. 7, the member 26 is provided with a reduced portion 36, about which is positioned a metallic sleeve 37. A head, 38, is provided for this end of the member, said head being providing with a hub portion 39, adapted to rest in a pocket or recess 40, formed in the end of the portion 36. Formed in the head 38 is a peripheral groove 41 adapted for the reception of the metallic resilient spring 42, in which is mounted fixedly a pin 43 adapted to engage in a slot 44 formed in the head 38. This head is provided with a cut away portion as shown in Fig. 6, and with a plurality of pockets in which are positioned the coil springs 35. Projected through the head 38 is a screw 45 which threads into an interiorly threaded socket formed in the end of the portion 36.

As shown, the springs 42 and 29 are pressed outwardly so as to form a pilot for the reamer while in operation. The diameter of the ring 37 may be materially smaller than the diameter of the head 26 or the shank 9, owing to the fact that these rings will press outwardly into engagement with a larger bore. With a reamer constructed in this manner, it is possible to employ all of the advantages herein set out, and at the same time have a portion of the device of considerably reduced diameter, preceding the cutting element into the bore. As an example of the diameters of the various portions of this device, if the portion 9 represents 1.500 of an inch, the head 26 may represent 1.498 of an inch, and the distance from the cutting edge to the circumference of the head, diametrically opposite, would represent 1.500 of an inch. The diameter of the ring 37 might then represent 1.492 of an inch.

The device may be used either in a power-driven holder such as the tail-stock of the lathe, or in a hand-operated holder, as desired.

With a reamer of this class, the blade or cutting element is very easily constructed, and may be quickly removed and replaced. Owing to the adjustable feature of the blade, the same may be frequently sharpened and because of its structure, the sharpening process may be easily and quickly performed.

The head 38 is locked in relative position on the portion 36 by means of a key which is inserted in a slot 46 and 46', formed in the portions 38 and 46.

While I have illustrated and described the preferred form of construction, I do not wish to limit myself to the precise details of structure set forth, but desire to avail myself of such variations and modifications as come within the scope of the appended claims.

Having thus described my invention, what I claim as new and desire to secure by Letters Patent is:

1. A reamer comprising a shank; a head of less diameter than said shank mounted thereon; a cutting element mounted on said head; yieldable pilot members associated with said head for operating as a pilot for said cutting member; and resilient means for maintaining said pilot members in outwardly pressed position.

2. In a reamer, a pilot having yieldable engaging members adapted for compressing inwardly; and resilient means for maintaining said engaging members in outwardly pressed position.

3. A reamer comprising a shank; a reduced head mounted thereon; a cutting member mounted on said head, and adjustable relatively thereto; a peripheral groove formed in said head; a resilient engaging member seated in said groove; and resilient means mounted in pockets formed in said head for preventing inward movement of said resilient means relatively to said head; a reduced neck formed on said head; a sleeve mounted on said neck; a head adapted for mounting on said neck; a resilient member mounted in a peripheral groove on said head last mentioned for operating as an engaging member to serve as a pilot for said cutting member.

In testimony whereof I have signed the foregoing specification.

KARL BECHHEIM.